(12) United States Patent
Criscitiello

(10) Patent No.: US 8,240,566 B1
(45) Date of Patent: Aug. 14, 2012

(54) BLOCKING DEVICE FOR A MAGNETIC-STRIPE CARD READER

(75) Inventor: Carolyn F. Criscitiello, Williamsville, NY (US)

(73) Assignee: M&T Bank Corporation, Buffalo, NY (US)

( * ) Notice: Subject to any disclaimer, the term of this patent is extended or adjusted under 35 U.S.C. 154(b) by 0 days.

(21) Appl. No.: 13/285,411

(22) Filed: Oct. 31, 2011

Related U.S. Application Data

(60) Provisional application No. 61/521,255, filed on Aug. 8, 2011.

(51) Int. Cl.
*G06K 7/00* (2006.01)
(52) U.S. Cl. .......................... 235/439; 235/379; 235/486
(58) Field of Classification Search .................. 235/379, 235/380, 439, 486
See application file for complete search history.

(56) References Cited

U.S. PATENT DOCUMENTS

| 7,810,734 B2 * | 10/2010 | Rakoff et al. ................. 235/475 |
| 2007/0040023 A1 * | 2/2007 | Ruggirello et al. ........... 235/382 |

* cited by examiner

Primary Examiner — Jamara Franklin
(74) Attorney, Agent, or Firm — K&L Gates LLP

(57) ABSTRACT

A blocking device for a magnetic-stripe or EMV® card reader, such as readers on an Automated Teller Machine (ATM), point of sale (POS) machine, or gas station pump. The blocking device securely attaches to the transaction machine such that unauthorized removal of the blocking device is difficult and likely will attract attention. The blocking device surrounds exposed portions of a magnetic-stripe card reader housing such that a skimming mold that fits over both the housing and the blocking device will stand out and be obvious to a user of the transaction machine. Also, a skimming mold fitting over the blocking device may prevent a card holder from properly inserting a magnetic-stripe card into the card reader. The difficulty of placing a skimming mold under or over the blocking device likely will deter a potential criminal skimmer from attempting to attach a skimming device in the first place.

28 Claims, 9 Drawing Sheets

BLOCKING DEVICE FOR A MAGNETIC-STRIPE CARD READER

CROSS-REFERENCE TO RELATED APPLICATIONS & PRIORITY CLAIM

This application claims priority to U.S. Provisional Application Ser. No. 61/521,255, filed on Aug. 8, 2011, the entire contents of which are incorporated by reference herein.

BACKGROUND

Magnetic-stripe cards are often used as credit cards, debit cards, and Automated Teller Machine (ATM) cards. These magnetic-stripe cards are used with transaction machines, such as ATMs, gas station pumps, and point-of-sale (POS) machines (for example, at a grocery store, drug store, or department store), any of which include a card reader that reads account information from the card. The magnetic-stripe cards also may be used to gain access to a transaction machine. For example, some ATMs are enclosed in a vestibule, and entry to the vestibule is provided through a locked door that may be unlocked in response to a user inserting a magnetic-stripe card in a card reader associated with the door. The card readers usually are one of three types: dip readers, swipe readers, and motorized readers. To use a dip reader, a card holder inserts the magnetic-stripe card into a slot and then immediately withdraws the card. The dip reader includes a scanning head in the slot that reads the account information on the magnetic stripe of the magnetic-stripe card as the card holder inserts and removes the card. To use a swipe reader, a card holder slides the magnetic-stripe card through a slot. The swipe reader includes a scanning head in the slot that reads the account information on the magnetic stripe of the magnetic-stripe card as the card is passed through the slot. To use a motorized reader, a card holder inserts the card into a slot. In the slot, motors and grabbing devices take hold of the magnetic-stripe card and pull the card into an internal portion of the card reader. The card reader then moves the card such that its magnetic stripe passes over a scanning head that reads the card. The motorized reader usually holds the card until the card holder has completed a transaction. Often times, in addition to passing a magnetic-stripe card through a card reader, a card holder also must enter a code (often referred to as a "personal identification number" or "PIN") into a keypad on the transaction machine.

Magnetic-stripe card readers are susceptible to "skimming," in which the account information on a magnetic-stripe card and the PIN entered onto a keypad are secretly recorded for later use by a criminal (called a "skimmer" herein). The skimmer wants the mold to be unnoticed by the card holder at the transaction device. The mold may be an exact replica of the exterior surface of the card reader that fits over the card reader. Alternatively, the mold may have a generic look. In either instance, the skimmer wants the mold to be as small as possible to minimize chances that a card holder (or any other person) recognizes that the mold is on the transaction device. The mold includes a scanning head that reads the account information off of the magnetic stripe of the magnetic-stripe card. The mold also includes a memory device coupled to the scanning head that stores the account information for later retrieval by the skimmer. Importantly, the mold must not interfere with the card holder's ability to use the card reader. If the card holder is not able to insert a magnetic-stripe card and have it read by the transaction machine, then the user likely will not attempt to enter the PIN and may be alerted to the possibility of a skimming device being used. For this additional reason, a skimming device mold must be as small as possible so that it does not interfere with a card user's use of a magnetic-stripe card in a transaction machine.

The skimmer also discretely places a small camera on or nearby the transaction machine that captures images of the keypad of the transaction machine so that the skimmer can get both the account information from the magnetic-stripe card and also the PIN associated with the card.

BRIEF DESCRIPTION OF THE SEVERAL DRAWINGS

The novel features of the various embodiments are set forth with particularity in the appended claims. The various embodiments, however, both as to organization and methods of operation, together with further objects and advantages thereof, may best be understood by reference to the following description, taken in conjunction with the accompanying drawings as follows.

Figure 3:
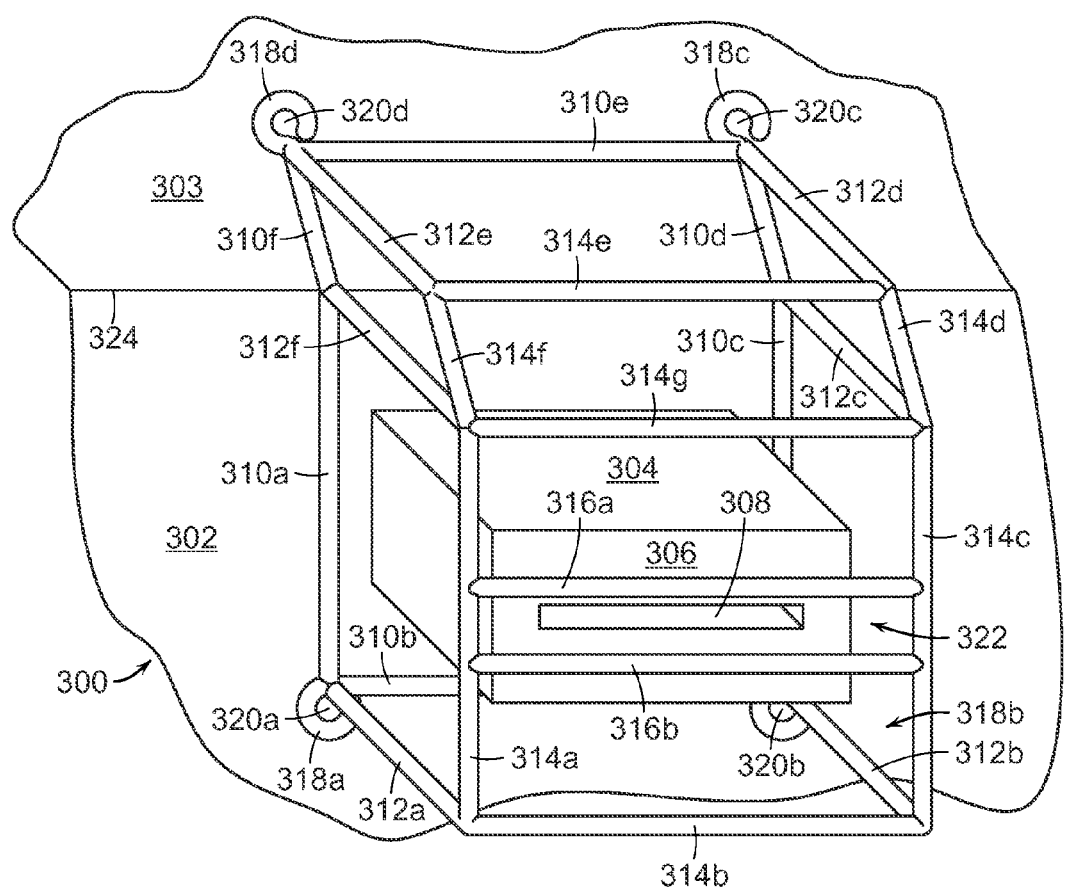
Figures 4, 5:
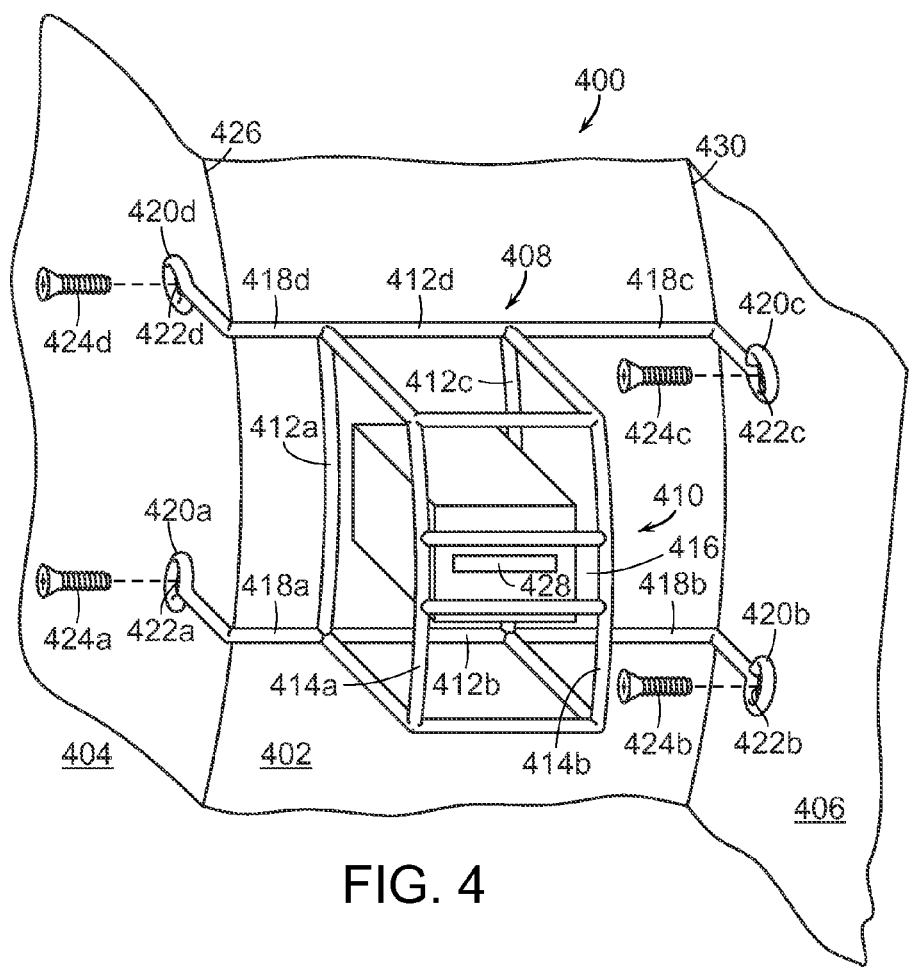
Figure 7:
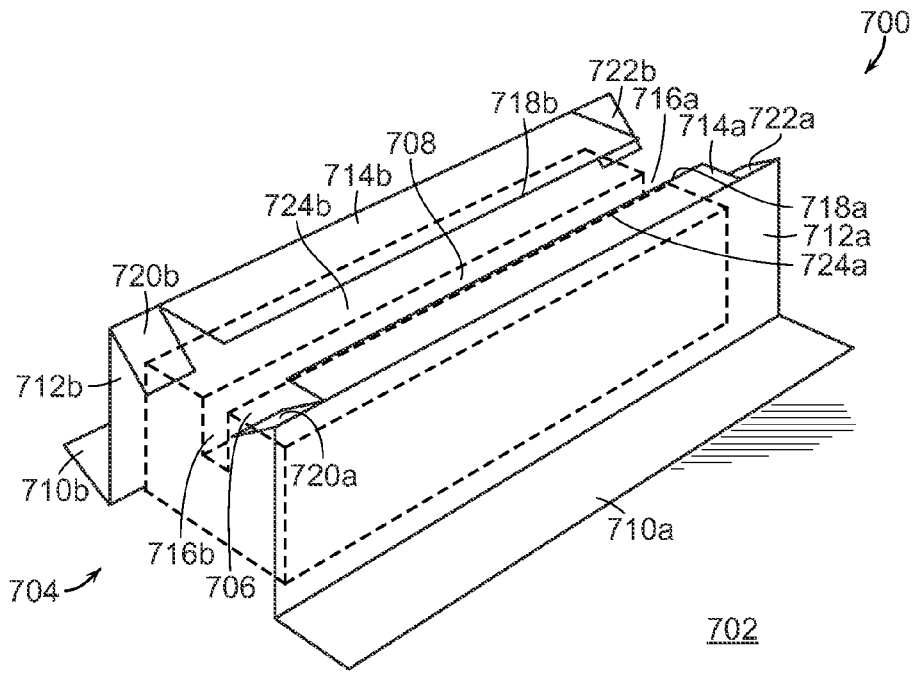
Figure 8:
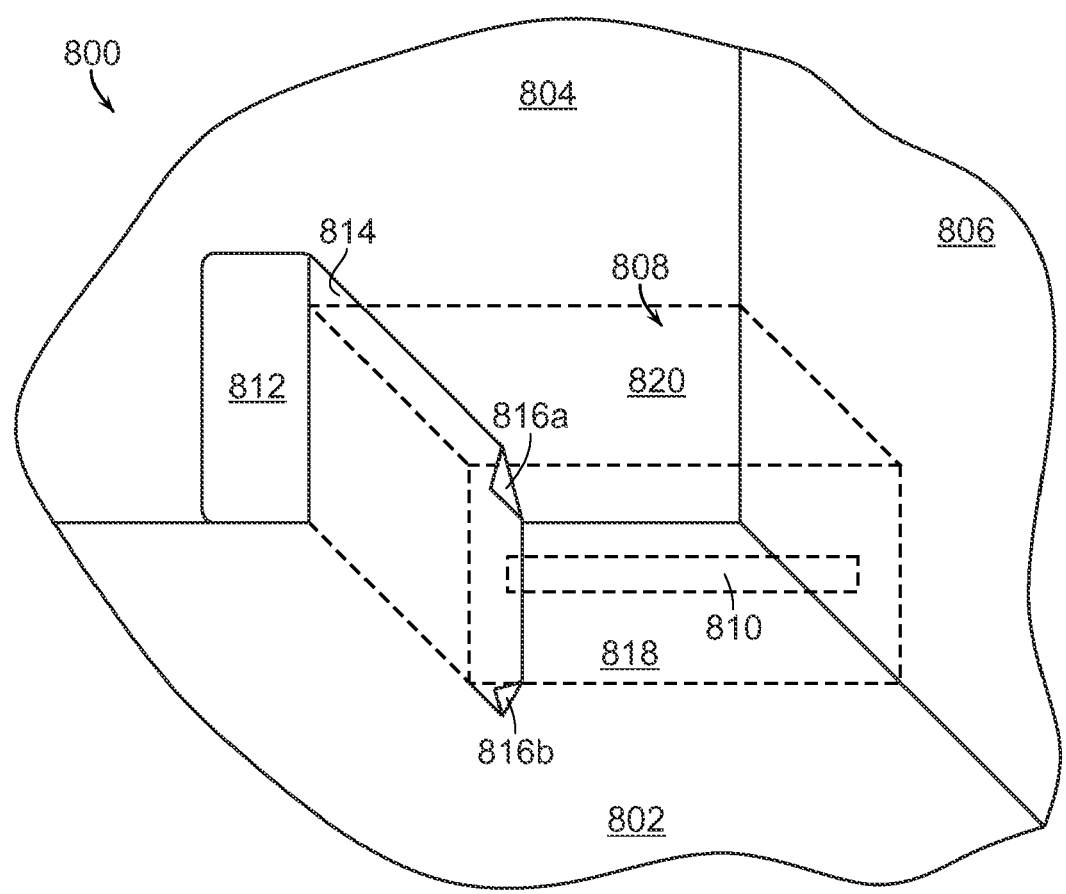
Figure 9A:
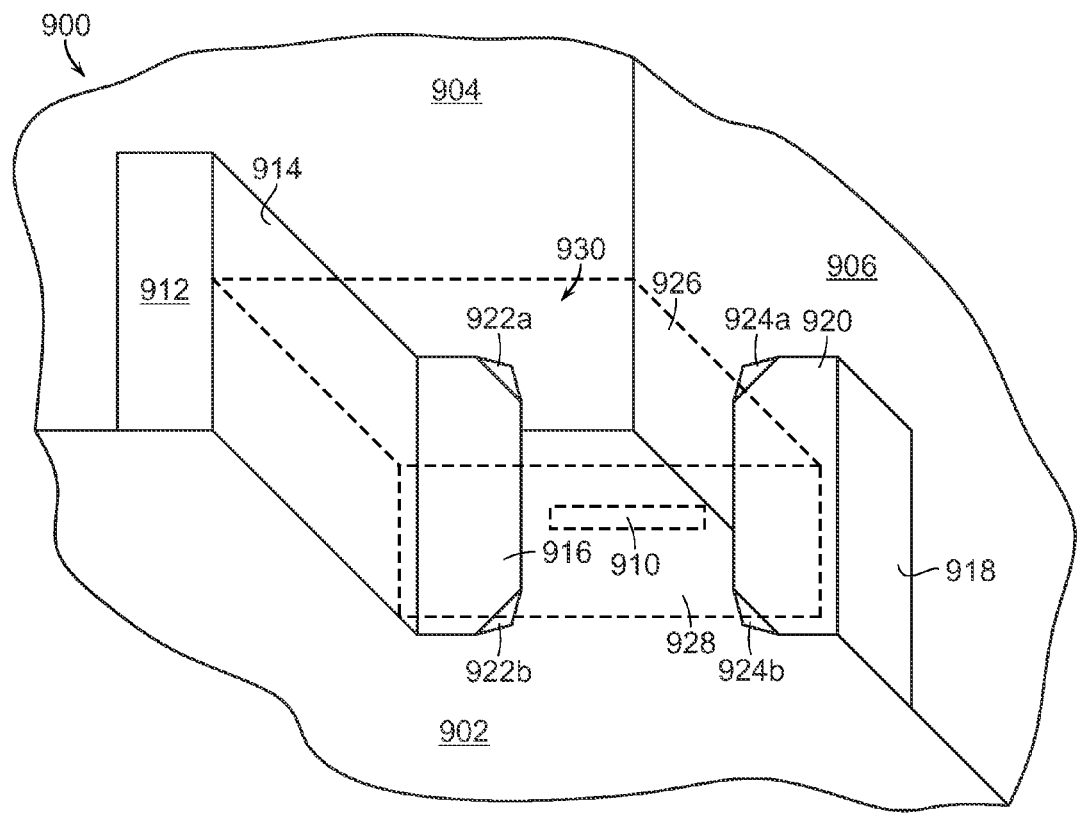
Figure 9B:
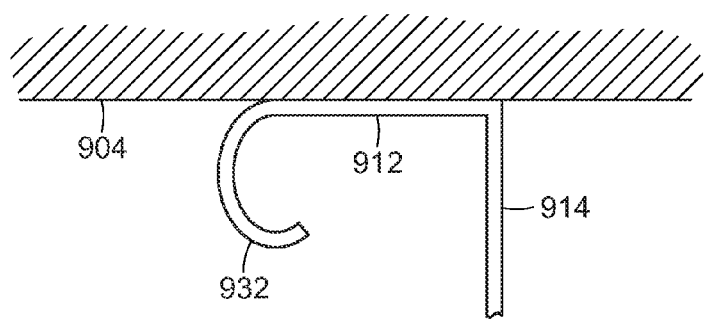

FIG. 3 illustrates an embodiment of a blocking device.
FIG. 4 illustrates an embodiment of a blocking device.
FIG. 5 illustrates an embodiment of a blocking device.
FIGS. 6A-6D illustrate an embodiment of a blocking device.
FIG. 7 illustrates an embodiment of a blocking device.
FIG. 8 illustrates an embodiment of a blocking device.
FIG. 9A illustrates an embodiment of a blocking device.
FIG. 9B illustrates an embodiment of a blocking device.

DETAILED DESCRIPTION OF THE INVENTION

The present invention relates to a secure blocking device that can be placed over a card reader of a transaction machine, or any other card reader, such as a card reader for a vestibule door, that resist a skimmer placing a skimming device mold over or under the blocking device. The blocking device is secure such that attempts to remove it would draw attention to the skimmer. Likewise, a skimming device mold large enough to surround a volumetric space defined by the blocking device and the card reader would need to be so large that it would look out of place to a card holder using the transaction machine. The size of the skimming device mold may also be so large (to surround the blocking device) that it prevents the card holder from using the card reader. The blocking device can be used on any type of transaction device, including different makes and models. Also, the blocking device has a simple design and simple construction, so it can easily and quickly be adapted to counter new skimming device molds that may be contrived by criminals in the future. Furthermore, the simple design results in substantially no hardware or software upgrades of the transaction machines on which they are installed, and no special training is required to install the blocking device. Also, the blocking device does not affect the underlying functionality of magnetic-stripe cards or magnetic-stripe card readers.

Figure 1A:
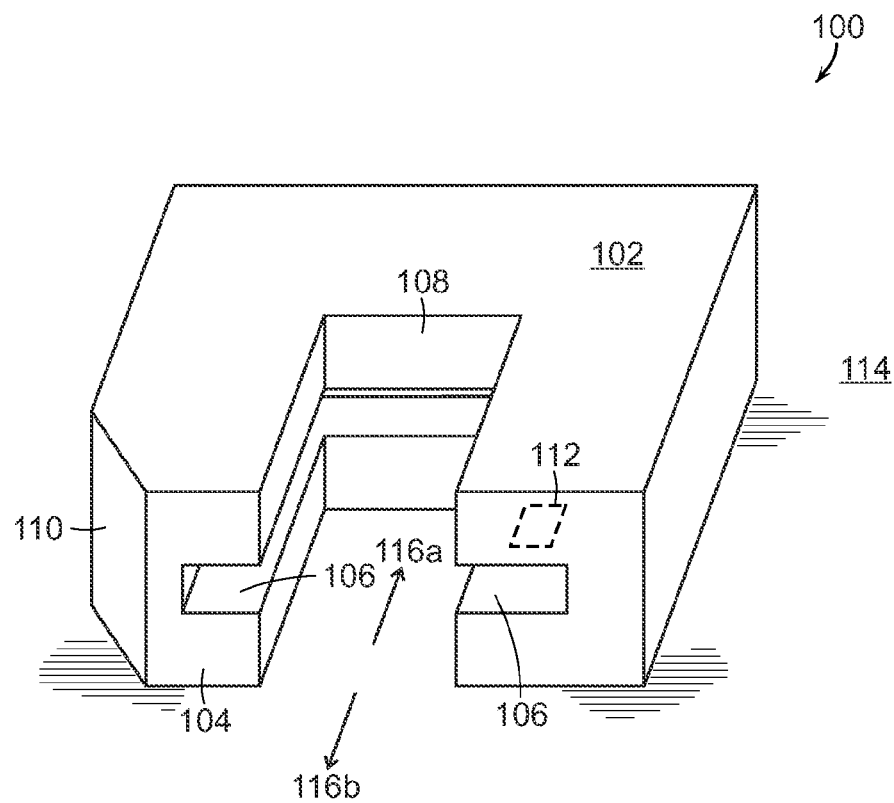
FIG. 1A illustrates a dip reader style of magnetic-stripe card reader.

FIG. 1A is a perspective view of a dip reader style of magnetic-stripe card reader 100 that may be used in connection with certain embodiments of the invention. The magnetic-stripe card reader 100 has a housing 102 that is attached to a surface 114 of a transaction machine, such as an Automated Teller Machine (ATM), a gas station pump, or a point of sale (POS) device, such as those commonly found at cash registers at grocery stores, drug stores, department stores, and other sales locations. The magnetic-stripe card reader 100 also may be associated with other devices, such as a door vestibule. The housing 102 of the magnetic-stripe card reader 100 includes a front surface 104 that includes a slot 106 that passes into the housing 102. The housing 102 also includes a gap 108. When a card holder inserts a magnetic-stripe card (not shown) into the slot 106 in the direction of arrow 116a, the card holder's fingers (not shown) can fit into the gap 108 so that the card holder can maintain her grip on the card. When the card holder slides the magnetic-stripe card into the slot 106 in the direction of arrow 116a and then pulls the card out of the slot 106 in the direction of arrow 116b, a scanning head 112 in the housing 102 reads account information from a magnetic stripe (not shown) on the magnetic-stripe card. The housing 102 may include one or more angular faces 110.

Figure 1B:
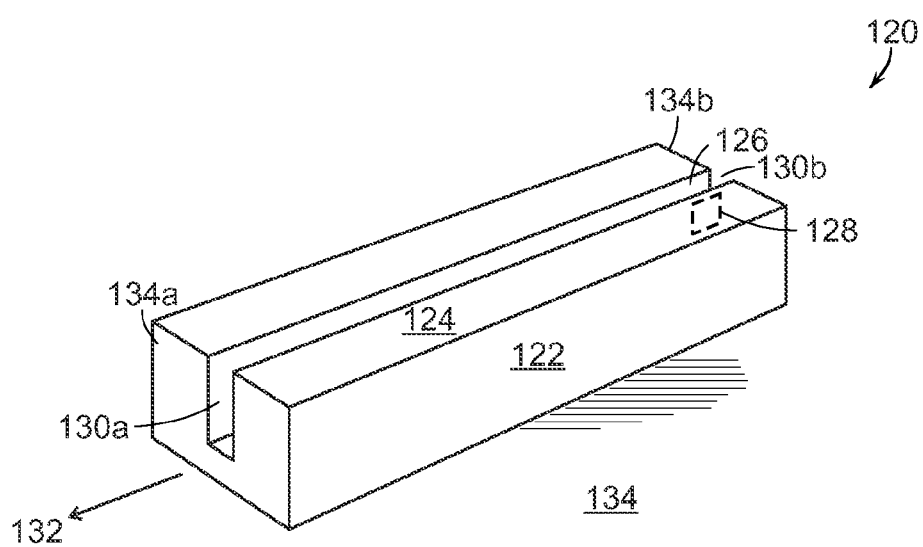
FIG. 1B illustrates a swipe reader style of magnetic-stripe reader.

FIG. 1B is a perspective view of a swipe reader style of magnetic-stripe card reader 120 that may be used in connection with certain embodiments of the invention. The magnetic-stripe card reader 120 has a housing 122 that is attached to a surface 134 of a transaction machine, such as an Automated Teller Machine (ATM), a gas station pump, or a point of sale (POS) device, such as those commonly found at cash registers at grocery stores, drug stores, department stores, and other sales locations. The magnetic-stripe card reader 100 also may be associated with other devices, such as a door vestibule. The housing 122 of the magnetic-stripe card reader 120 includes a front surface 124 that includes a slot 126 that passes from a first side 134a of the housing 122 to a second side 134b of the housing 122 such that the slot 126 has open ends 130a,b. When a card holder inserts the magnetic stripe (not shown) of a magnetic-stripe card (not shown) into the second open end 130b of the slot 126 and pulls (or swipes) the card in the direction of arrow 132, a scanning head 128 in the housing 122 reads account information stored on the magnetic stripe of the magnetic-stripe card. Typically, the card holder swipes the card in the direction of arrow 132 until the card exits through the first open end 130a of the slot 126.

Figure 1C:
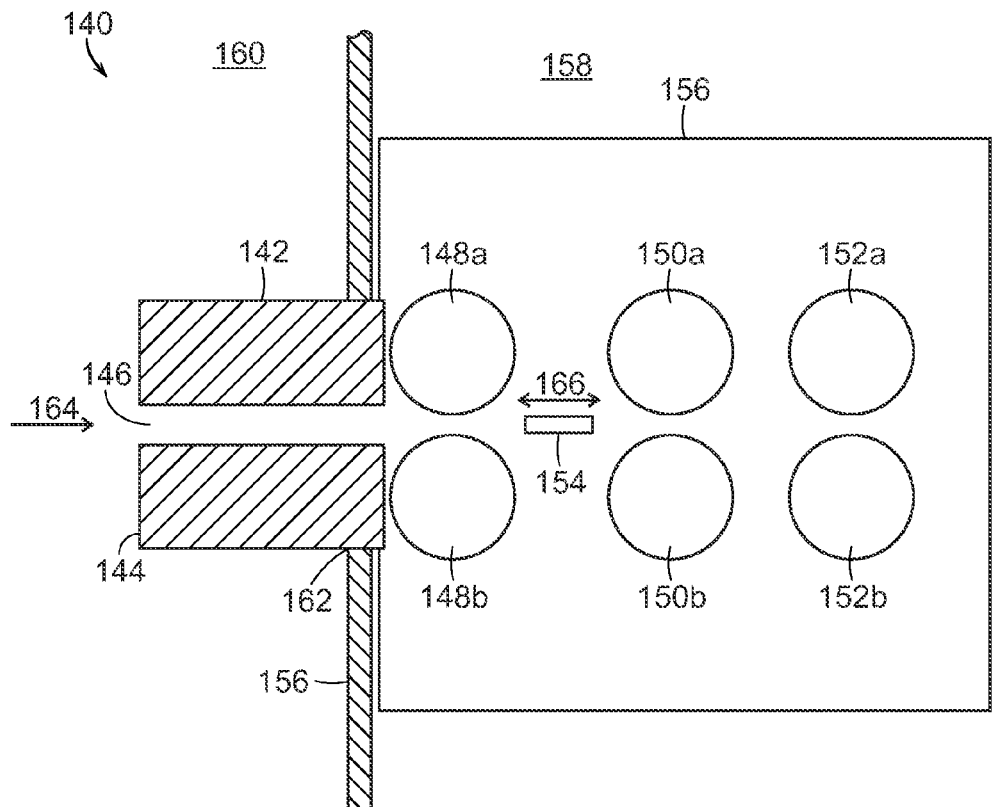
FIG. 1C illustrates a motorized magnetic-stripe reader.

FIG. 1C is a cross-sectional side view of a motorized reader style of magnetic-stripe card reader 140 that may be used in connection with certain embodiments of the invention. The magnetic-stripe card reader 140 includes a housing 142 mounted to a machinery housing 156. The machinery housing 156 is in an interior space 158 of the transaction machine and the housing 142 extends through an opening 162 in a surface 156 of the transaction machine such that at least a portion of the housing 142 is in an exterior space 160 of the transaction machine. A front face 144 of the housing 142 includes a slot 146 that is arranged to accept a magnetic-stripe card (not shown). The card holder inserts a magnetic-stripe card into the slot 146 in the direction of arrow 164. When the magnetic-stripe card has been inserted into the slot 146 by a certain amount, rollers 148a,b, powered by electric motors (not shown), grab the magnetic-stripe card and pull the card into the interior of the machinery housing 156. Additional sets of rollers 150a,b and 152a,b may also be placed in the machinery housing 156 to further move the magnetic-stripe card within the machinery housing 156 in the directions of arrows 166. As the magnetic-stripe card is moved in the directions of arrows 166, a reader head 154 reads account information from the magnetic stripe of the magnetic-stripe card. When the card holder has completed a transaction the rollers 148a,b, 150a,b, and 152a,b return the magnetic-stripe card to the card holder through the slot 146.

Some magnetic-stripe cards also may include EMV® Integrated Circuit Cards. Accordingly, some magnetic-stripe card readers may include EMV® Integrated Circuit Card readers. EMV® is an acronym based on the names of the original organizations that created it: Europay, MasterCard®, and Visa®. EMV® uses an integrated circuit chip embedded in the card that communicates with the EMV® reader. The terms "magnetic-stripe card reader" and "card reader" used herein refer to any card reader that reads a card having a magnetic stripe (including card readers that also incorporate EMV® readers) and also any card reader that will accept a magnetic-stripe card form factor, such as, for example, an EMV®-only reader that is capable of accepting, but not reading, a magnetic-stripe card. Likewise, the term "magnetic-stripe card" used herein refers to cards with magnetic stripes and also to cards that have technology, such as, for example, an EMV® integrated circuit, in addition to a magnetic stripe.

Figure 2A:
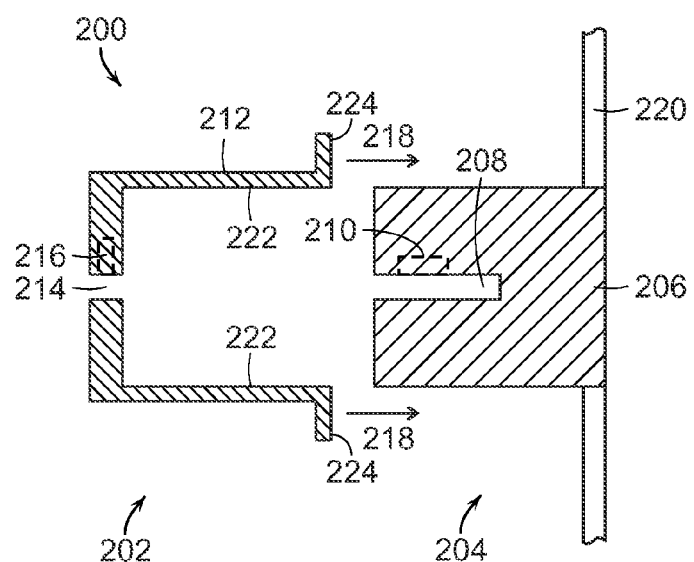
FIG. 2A is an exploded side view of a magnetic-stripe reader and a skimming mold.

FIG. 2A is an exploded cross-sectional side view of an example skimming device 202 and a magnetic-stripe card reader 204. The magnetic-stripe card reader 204 is shown as a dip reader style of magnetic-stripe card reader, but a person having ordinary skill will appreciate that the magnetic-stripe card reader 204 also could be a swipe reader or a motorized reader. The magnetic-stripe card reader 204 includes a housing 206 on a surface 220 of a transaction machine. The housing 206 has a slot 208 and a reader head 210 in the slot 208. The skimming device 202 has an outer mold 212 that includes an opening 214. A reader head 216 is located on the mold 212 at the opening 214. The mold includes surfaces 222 and 224 that align with or conform to surfaces of the housing 206 and of the surface 220 of the transaction machine. The skimmer attaches the skimming device 202 by placing the skimming device mold 212 over the magnetic-stripe card reader 204 as indicated by arrows 218. The skimmer may place an adhesive on surfaces 222 and/or 224 of the skimming device mold 212 to adhere to mating surfaces of the card reader housing 206.

Figure 2B:
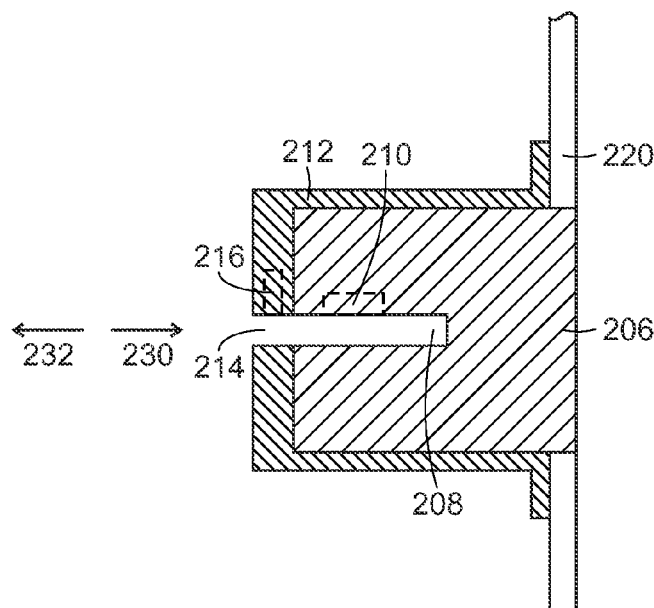
FIG. 2B is a side view of a magnetic-stripe reader with a skimming mold in place.

FIG. 2B shows the skimming device 202 placed over the magnetic-stripe card reader 204. The opening 214 in the skimming device mold 212 of the skimming device 202 aligns with the slot 208 of the magnetic-stripe card reader 204. Also, in the direction of arrows 230 and 232, reader head 216 of the skimming device 202 is aligned with the reader head 210 of the magnetic-stripe card reader 204. When a card holder inserts a magnetic-stripe card (not shown) into the combined skimming device 202 and magnetic-stripe card reader 204, the card passes through the opening 214 in the skimming device and into the slot 208 of the magnetic-stripe card reader 204, and both the reader head 216 of the skimming device 202 and the reader head 210 of the magnetic-stripe card reader 204 read the account information stored on the magnetic stripe of the card. Because the skimming device 202 fits so closely over the profile of the magnetic-stripe card reader 204, the card holder likely will not notice its presence. Also, because the skimming device 202 and its reader head 216 do not interfere with the reader head 210 of the magnetic-stripe card reader 204, the transaction machine will function normally, and the card holder is unlikely to notice that something is amiss.

FIG. 3 is a perspective view of an embodiment of a blocking device 300 for a transaction machine, such as an ATM, gas station pump, or a POS machine. The transaction machine includes a card reader housing 304 mounted to a first surface 302 of the transaction machine. The transaction machine includes a second surface 303 at an angle relative to the first surface 302 along a common edge 324. The card reader housing 304 includes a front face 306 and slot 308 for receiving a magnetic-stripe card (not shown). The blocking device 300 includes a base portion that includes members 310a-f. In this embodiment, members 301a-f are made of heavy-gauge metal wire or metal rod. The metal may be any metal, such as steel or aluminum. Because some transaction machines are placed in outdoor locations that are exposed to the elements, metals that do not rust may be preferable. The members 301a-f may be joined together by welding or they may comprise a single piece of wire or rod that is bent at the junction of two members. Members 310a-c lie substantially in a plane parallel to surface 302 and members 310d-f lie substantially in a plane parallel to surface 303 such that when the blocking device 300 is installed on the transaction machine, the base portion substantially conforms to surfaces 302 and 303 of the transaction machine.

The blocking device 300 also includes a cage portion that includes members 312a-f, which protrude from the base, and members 314a-g, which connect distal ends of members 312a-f. Members 312a-f and 314a-g also may be made of heavy-gauge metal wire or metal rod. The cage portion includes additional members 316a and 316b, which are attached to members 314a and 314c, and which form an aperture 322 around the slot in the front face 306 of the card reader housing 304. The aperture 322 provides at least sufficient space for a magnetic-stripe card to be passed therethrough for placement in the slot 308 of the card reader housing 304. The aperture 322 also may provide sufficient space for a card holder's hand (or a part of the hand) to fit through if necessary for the card holder to be able to insert the card into the slot 308. However, the aperture 322 is not so large as to permit a skimming device to be passed therethrough for application to the card reader housing 304. Members 312a-f, 314a-g, and 316a-b form a cage that surrounds the card reader housing 304 and that forms a volumetric space such that a skimming device mold, such as that shown in FIGS. 2A and 2B, placed over the cage would be so large as to look out of place and draw attention to itself.

The entire blocking device 300 may be coated in a plastic, rubber, or other material that prevents the card-holders' hands from coming in contact with sharp and/or hard metal. Such a coating also may protect the metal wire or rod material from corrosion damage. The coating also may carry a brand logo of the transaction device or the transaction device operator. The coating also could be formed in a color that matches brand colors for the transaction device or the transaction device operator. The blocking device 300 also includes multiple mounting locations 318a-d, shown in FIG. 3 as loops 318a-d with holes 320a-d therein. Screws, bolts, rivets, or other fasteners can be placed through the holes 320a-d to secure the blocking device 300 to the surfaces 302, 303 of the transaction machine. FIG. 4 shows similar mounting locations with screws 424a-d aligned with holes 422a-d of loops 420a-d. The loops 318a-d may be formed of portions of wire or metal rod, or they may be formed of washers or the like that are welded to base members 310a-f. As used herein, the term "secure" does not necessarily mean that the blocking device 300 cannot be removed. Instead, "secure" means that the effort required by a skimmer to remove the blocking device 300 likely would draw unwanted attention to his actions. Alternatively, the mounting locations may be plates that provide a surface for applying a strong adhesive for affixing the blocking device 300 to the surfaces 302, 303. Use of an adhesive may be preferable if drilling holes in the surfaces 302, 303 at the positions of the mounting locations 318a-d in an installed configuration would cause damage to internal components of the transaction machine. For example, the internal components in the machinery housing 156 shown in FIG. 1C may be damaged by holes being drilled into surface 156 for mounting a blocking device over the card reader housing 142.

The blocking device 30 may substantially fill an operating volume in which a card holder must be able to manipulate a magnetic-stripe card to pass it into or through a card reader slot 308. Put another way, the card holder must be able to hold onto the card up to a distance away from the card reader housing 304 where the card reader reads the card (in the case of dip readers and swipe readers, examples of which are described above with respect to FIGS. 1A and 1B) or where the card reader grabs the card (in the case of motorized readers, examples of which are described above with respect to FIG. 1C). The boundaries defined by this distance away from the card reader housing 304 form the operating volume. Certain embodiments of the blocking device 300 are sized so that a card holder may reach into the operating volume, such as, for example, through aperture 322, to manipulate the card, but a volume added by attaching a skimming device outside of the blocking device 300 may prevent the user from manipulating the card in the operating volume, thereby preventing the user's card from being read. Certain embodiments of other blocking devices disclosed herein also may be similarly sized.

FIG. 4 is a perspective view of an embodiment of a blocking device 400 covering a card reader 410 mounted to a first surface 402 of a transaction machine. The blocking device includes a base portion that includes members 412a-d. The first surface 402 of the transaction machine has a curved surface as can be seen by edge 426 that is shared with a second surface 404. Members 412a and 412c are curved to match the contours of the first surface 402. The blocking device 400 includes a cage portion like the cage portion of FIG. 3, including having an aperture 416 over a slot 428 in the card reader housing 410. Members 414a and 414b of the cage portion are shown having a curve that matches the curve of members 412a and 412c of the base portion. Alternatively, members 414a and 414b may have a different curvature from members 412a and 412c.

The base portion also includes extension members 418a-d that extend away from the blocking device and include mounting locations 420a-d at their ends, shown in FIG. 4 as loops 420a-d with holes 422a-d therein. The extension members 418a-d extend beyond edges 426, 430 of the first surface 402 and the extension members 418a-d include bends or curves to place the mounting locations 420a-d onto the second surface 404 and a third surface 406. Screws 424a-d are placed in holes 422a-d of the mounting locations for mounting to the transaction machine. By moving the mounting locations away from the card reader 410 and, in the example embodiment shown in FIG. 4, onto separate surfaces 404 and 406, the chances of inadvertently damaging internal components of the card reader are reduced.

FIG. 4 shows curved members 412a and 412c in the same blocking device with extension members 418a-d. However, the curved members 412a and 412c may be used in a blocking device without the extension members 418a-d and vice versa.

FIG. 5 is a perspective view of an embodiment of a blocking device 500 mounted on a surface 502 of a transaction machine. The card reader housing 504 is shown in dashed lines. The blocking device 500 includes a first base plate 510a and a second base plate 510b. Each of the two base plates 510a,b substantially conforms to contours at the location on the surface 502 on which each is mounted. Plates 512a and 512b protrude from respective base plates 510a,b on sides of a card reader housing 504. Plates 514a and 514b extend from ends of respective plates 512a,b in front of the face 506 of the card reader housing 504. The plates 514a,b have respective edges 518a,b that are arranged on ends 516a,b of the card slot 508. The space between edges 518a,b comprises an aperture 520 through which a magnetic-stripe card (not shown) may pass to be placed into the slot 508 of the card reader housing 504. The edges 516a,b are spaced from respective ends 516a,b of the card slot such that a magnetic-stripe card may be placed into the slot. Preferably, the edges 516a,b are sufficiently close to respective ends 516a,b of the slot 508 so that if a skimming device were placed over the blocking device 500, then the portions of the skimming device covering the edges 516a,b of plates 514a,b also will partially cover the ends 516a,b of the slot 508 and thereby prevent a magnetic-stripe card from being inserted into the slot 508. Base plate 510a, plate 512a, and plate 514a may be made of a single piece of metal that is bent. Alternatively, base plate 510a, plate 512a, and plate 514a may start as three pieces of metal that are joined together, for example, by welding. Similarly, base plate 510b, plate 512b, and plate 514b may be made of a single piece of metal that is bent or may be welded together.

In FIG. 5, plates 510a and 510b have a height $H_1$ that is greater than a height $H_2$ of the card reader housing 504. Alternatively, plates 510a,b may have a height $H_1$ that is equal to or less than a height $H_2$ of the card reader housing 504.

Plates 510a and 510b may be securely affixed to surface 502 using an adhesive. Alternatively, plates 510a,b may be securely affixed to surface 502 using screws, bolts, rivets, or the like.

Figure 6A:
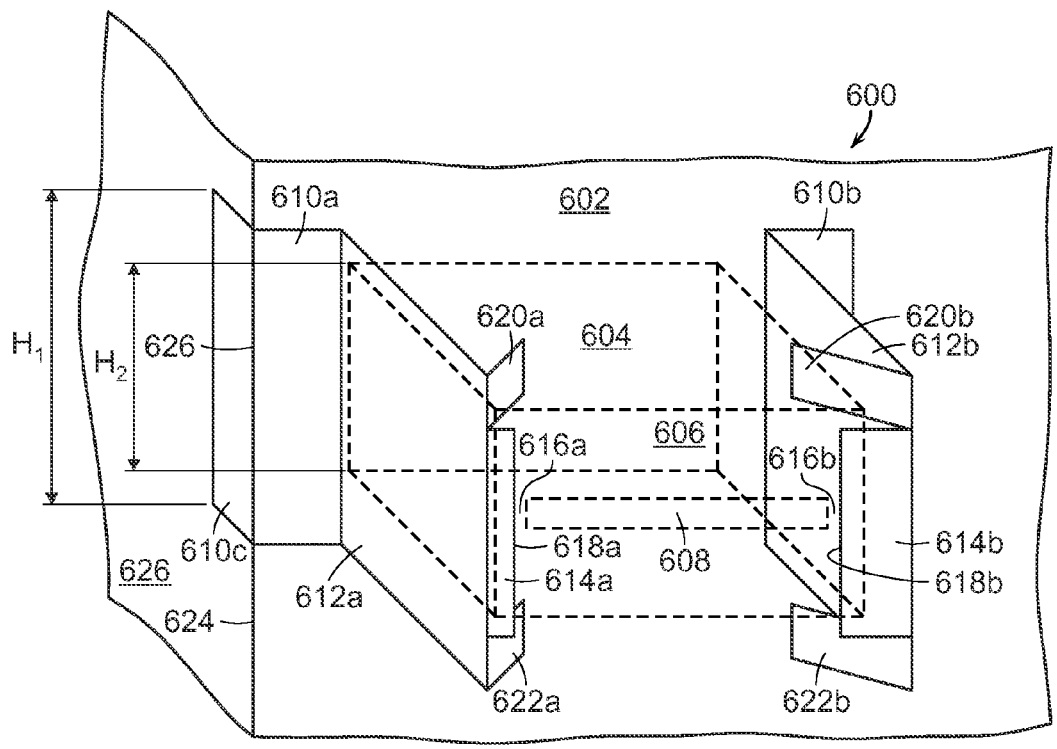

FIG. 6A is a perspective view of an embodiment of a blocking device 600 for a card reader housing 604 mounted on a surface 602 of a transaction machine. The card reader housing 604 is shown in dashed lines. The blocking device 600 includes a first base plate 610a and a second base plate 610b. Each of the two base plates 610a,b conforms to contours at the location on the surface 602 on which each is mounted. The transaction machine includes a second surface 626 at an angle relative to the first surface 602 and sharing a common edge 624 with the first surface 602. In this example embodiment, the first base plate 610a terminates at an edge 627 that is aligned with the edge 624 between the first surface 602 and the second surface 626 of the transaction machine. A third base plate 610c is attached to the first base plate 610a at the edge 626. The third base plate 610c may be attached to the first base plate 610a by welding, or the first and third base plates 610a,c may be formed from a single piece of metal that is bent at line 626. The third base plate 610c is at an angle relative to the first plate 610a that is substantially equal to the relative angle between first and second surfaces 602, 626. As such, when the base plates 610a,c are installed on surfaces 602, 626 of the transaction machine, the base plates 610a,c conform to the respective surfaces 602, 626. Plates 612a and 612b protrude from respective base plates 610a,b on sides of a card reader housing 604. Plates 614a and 614b extend from ends of respective plates 612a,b in front of the face 606 of the card reader housing 604. The plates 614a,b have respective edges 618a,b that are arranged on ends 616a,b of the card slot 608. The space between edges 618a,b is an aperture through which a magnetic-stripe card (not shown) may pass to be placed into the slot 608 of the card reader housing 604. The edges 616a,b are spaced from respective ends 616a,b of the card slot such that a magnetic-stripe card may be placed into the slot. Preferably, the edges 616a,b are sufficiently close to respective ends 616a,b of the slot 608 so that if a skimming device were placed over the blocking device 600, then the portions of the skimming device covering the edges 616a,b of plates 614a,b also will partially cover the ends 616a,b of the slot 608 and thereby prevent a magnetic-stripe card from being inserted into the slot 608. Plates 620a,b and 622a,b also extend from ends of respective plates 612a,b. Plates 620a,b are positioned on the end of respective plates 612a,b such that they are above the card reader housing 604 and are angled relative to respective plates 612a,b. The angle of the plates 620a,b relative to respective plates 612a,b results in the plates 620a,b crossing over the top of the card reader housing 604 in the direction of the surface 602. Likewise, plates 622a,b are positioned on the end of respective plates 612a,b such that they are below the card reader housing 604 and are angled relative to respective plates 612a,b such that the plates 622a,b cross over the bottom of the card reader housing 604 in the direction of the surface 602. Base plate 610a, plate 612a, plate 614a, 620a, and 622a may be made of a single piece of metal that is bent (and cut) to form the shape depicted in FIG. 6A. Alternatively, base plate 610a, plate 612a, plate 614a, 620a, and 620b may start as multiple pieces of metal that are joined together, for example, by welding. Similarly, base plate 610b, plate 612b, plate 614b, plate 620b, and 622b may be made of a single piece of metal that is bent (and cut) or may be welded together.

Figure 6B:
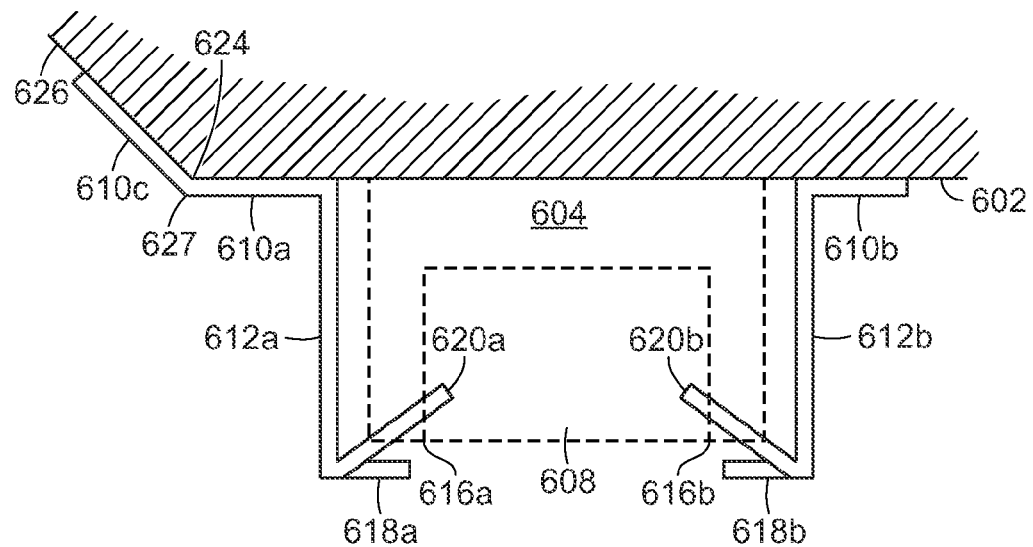
Figure 6C:
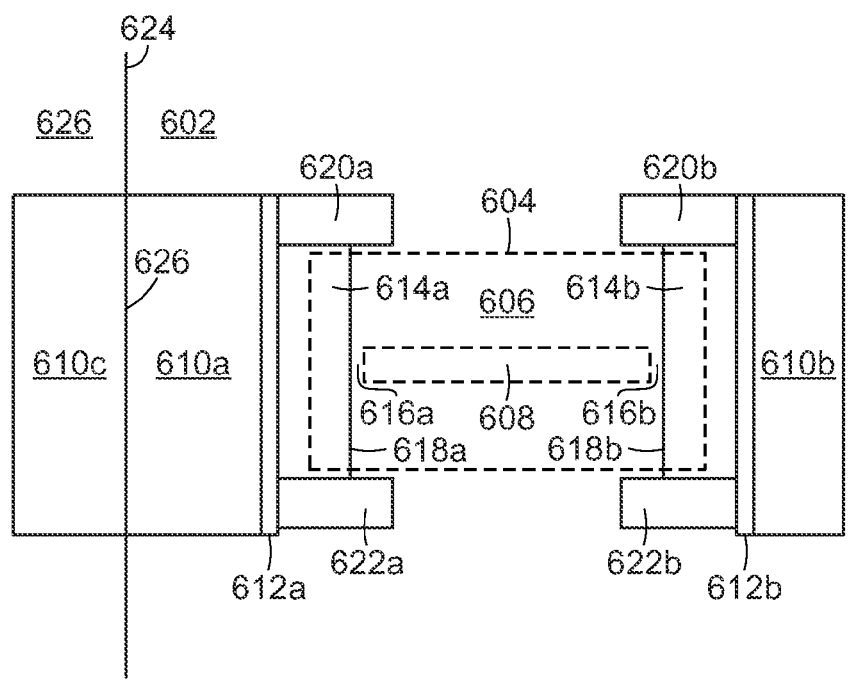
Figure 6D:
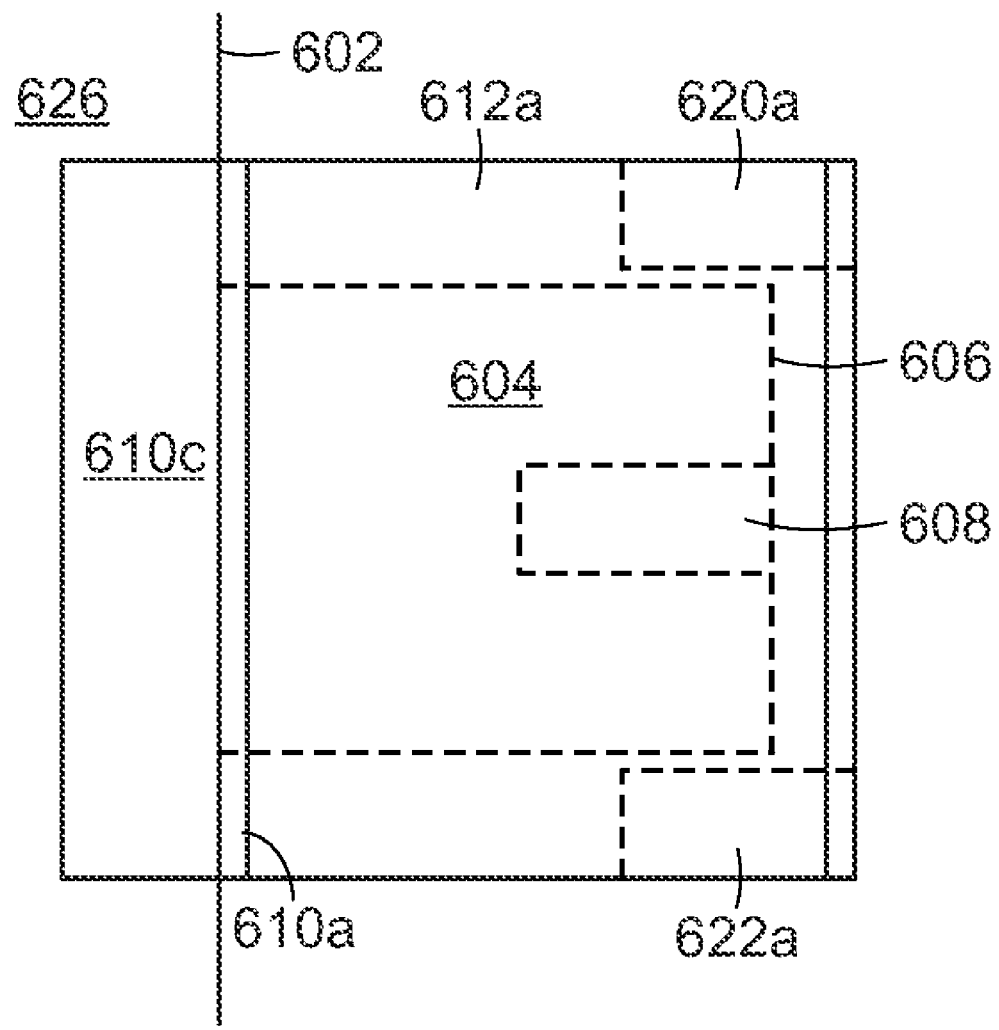

The geometry of the blocking device 600 in this embodiment provides no view (as shown by FIGS. 6A-6D) in which at least a portion of the card reader housing 604 is not blocked by a portion of the blocking device 600. FIGS. 6B, 6C, and 6D show top, front, and left side views, respectively, of the embodiment of a blocking device 600 shown in FIG. 6A. FIG. 6B shows plates 620a,b above the card reader housing 604 with plates 612a,b on sides of the card reader housing 604 and plates 618a,b in front of the card reader housing 604. Plates 622a,b are not shown in FIG. 6B but are beneath the card reader housing 604. Plates 622a,b may be of similar length and at a similar angle relative to the card reader housing 604 as plates 620a,b or they may be of different length and angle. Plates 620a,b partially block a view of the card reader housing 604 from above and plates 622a,b partially block a view of the card reader housing 604 from below. FIG. 6C shows plates 614a,b on sides of the card reader housing 604 and partially covering the front face 606 of the card reader housing 604. The edges 618a,b of respective plates 614a,b are close to ends 616a,b of the card slot 608 in the card reader. FIG. 6C also shows plates 620a,b above the card reader housing 604 and plates 622a,b below the card reader housing 604. Plates 614a,b partially block a view of the card reader housing 604 from the front. FIG. 6D shows a left side view of the blocking device 600 and shows plate 612a extending from base plate 610a away from surface 602 and extending past the front face 606 of the card reader housing 604. Plate 612a also extends above the top of the card reader housing 604 and below the bottom of the card reader housing 604. Plate 612a at least partially blocks a view of card reader housing 604 from the right. It is apparent from the drawings that plate 612b at least partially blocks a view of the card reader housing 604 from the left. Because there is no view in which the blocking device 600 does not at least partially block the card reader housing 604, it is very difficult for a skimmer to place a skimming device mold between the card reader housing 604 and the blocking device 600. Any mold that could be placed between the card reader housing 604 and the blocking device 600 likely would require multiple pieces that would be assembled on the card reader housing and/or would look out of place on the card reader.

Plates 610a and 610b may be securely affixed to surface 602 using an adhesive. Alternatively, plates 610a,b may be securely affixed to surface 602 using screws, bolts, rivets, or the like.

FIG. 7 is a perspective view of an embodiment of a blocking device 700 for a swipe reader style of card reader housing 704 on a surface 702 of a transaction machine. The card reader housing 704 is shown in dashed lines. The card reader housing 704 includes a slot 708 with open ends 716a,b. As described above with respect to FIG. 1B, a magnetic-stripe card is slid through the slot from a first open end 716a to a second open end 716b to be read. The blocking device 700 includes base plates 710a,b and plates 712a,b protruding from respective base plates 710a,b. Plates 714a and 714b extend from ends of respective plates 712a,b in front of the face 706 of the card reader housing 704. The plates 714a,b have respective edges 718a,b that are arranged on sides 724a,b of the card slot 708. The space between edges 718a,b is an aperture through which a magnetic-stripe card (not shown) may slide in the slot 708 of the card reader housing 704. The edges 716a,b are spaced from respective sides 724a,b of the card slot such that a magnetic-stripe card may be placed into the slot. Preferably, the edges 716 sufficiently close to respective ends 724a,b of the slot 708 so that if a skimming device were placed over the blocking device 700, then the portions of the skimming device covering the edges 716a,b of plates 714a,b also will partially cover the sides 724a,b of the slot 708 and thereby prevent a magnetic-stripe card from being inserted into the slot 708. Plates 720a,b and 722a,b also extend from ends of respective plates 712a,b. Plates 720a,b are positioned on the end of respective plates 712a,b such that they are at ends of the card reader housing 704 and are angled relative to respective plates 712a,b. The angle of the plates 720a,b relative to respective plates 712a,b results in the plates 720a,b crossing over an end of the card reader housing 704 in the direction of the surface 702. Likewise, plates 722a,b are positioned on the end of respective plates 712a,b such that they are on an opposite end of the card reader housing 704 and are angled relative to respective plates 712a,b such that the plates 722a,b cross over the side of the card reader housing 704 in the direction of the surface 702. Base plate 710a, plate 712a, plate 714a, 720a, and 722a may be made of a single piece of metal that is bent (and cut) to form the shape depicted in FIG. 7. Alternatively, base plate 710a, plate 712a, plate 714a, 720a, and 720b may start as multiple pieces of metal that are joined together, for example, by welding. Similarly, base plate 710b, plate 712b, plate 714b, plate 720b, and 722b may be made of a single piece of metal that is bent (and cut) or may be welded together.

Plates 710a and 610b may be securely affixed to surface 702 using an adhesive. Alternatively, plates 710a,b may be securely affixed to surface 702 using screws, bolts, rivets, or the like.

FIG. 8 is a perspective view of another blocking device 800 for a card reader housing 808 that is placed at an intersection of three surfaces 802, 804, 806 of a transaction machine. The card reader housing 808 is shown in dashed lines. The blocking device 800 includes a base plate 812 and a plate 814 extending from the base plate 812 along an exposed side of the card reader housing 808 opposite one of the walls (in the example shown in FIG. 8, opposite wall 806). The plate 814 extends beyond the front face 818 and the top face 820 of the card reader housing 808. The plate 814 optionally also includes angled portions 816a,b at corners. The plate 814, by itself, enlarges the dimensions that a skimming mold must accommodate to discretely cover the card reader housing 808. If a skimming device were to be placed over the blocking device, the volumetric space of the combined blocking device and skimming device may make it difficult or impossible for a card holder to insert a magnetic-stripe card (not shown) into the card slot 810 in the housing 808. The angled portions 816a,b further alter dimensions that the skimming mold must accommodate. Furthermore, the angled portions 816a,b may make it difficult or impossible for a skimmer to discretely attach a skimming mold over the card reader housing 808. Without the angled portions 816a,b, a skimmer may attempt to adhere a skimming mold to the outer face of plate 814 (the visible face in FIG. 8) because the large flat surface provides for good adhesion. However, the angled portions 816a,b act to hold a skimming mold away from the flat surface of plate 814 unless the skimming mold were to include bulges, humps, or other protrusions to accommodate the angled portions 816a, b. Thus, a skimmer would be faced with a choice of either using a skimming mold that does not adhere very well or to using a skimming mold with unusual-looking bulges or humps that draw unwanted attention to the skimming device.

FIG. 9A is a perspective view of another blocking device 900 for a card reader housing 930 that is placed at an intersection of three surfaces 902, 904, 906 of a transaction machine. The blocking device 900 includes a base plate 912 mounted to surface 904. A plate 914 extends from the base plate 812 along an exposed side of the card reader housing 930 opposite one of the walls (in the example shown in FIG. 9, opposite wall 906). The plate 914 extends beyond the front face 928 and the top face 926 of the card reader housing 930. A third plate 916 extends from plate 914 and extends in front of the front face 928 of the card reader housing 930. The plate 916 optionally also includes bent portions 922a,b at corners. The blocking device 900 also includes a second base plate 918 mounted to surface 906, and a plate 920 attached to the second base plate 918 that extends in front of the front face 928 of the card reader housing 930. The plate 920 optionally includes bent portions 924a,b. The plates 912, 914, 916 enlarge the dimensions that a skimming mold must accommodate to discretely cover the combination of the card reader housing 930 and the blocking device. These increased dimensions may make it difficult or impossible for a card holder to insert a magnetic-stripe card (not shown) into the card slot 910 in the housing. The bent portions 922a,b and 924a,b bend towards the card reader housing 930 and provide no view of the card reader housing 930 that is not blocked by a portion of the blocking device 900.

If the card reader housing 930 is not located at a corner of three surfaces, e.g., if surface 906 is absent from its shown location and surface 904 continues to the right of FIG. 9A, then the blocking device 900 may include a second side that is similar or identical to base plate 912, plates 914 and 916, and bent portions 922a,b.

FIG. 9B shows a top view an alternative embodiment of base plate 912 in which a free end of the base plate 912 includes a curl 932 away from surface 904. The curl 932 adds additional dimensions over which a skimming device must cover, again making it more difficult for a skimming device to be discretely placed on the card reader housing 930. Also, the curl 932 at least partially eliminates the base plate 912 as a flat surface to which a skimming device may be adhered, making it less likely that a skimming device can be securely adhered to the card reader housing 930 and the blocker 900. Although only shown in FIG. 9B, a person having ordinary skill understands that the curl 932 may be added to any of the free ends of base plates shown in any of the figures of this application.

It should be noted that the above-described embodiments are not limited in application or use to the details of construction and arrangement of parts illustrated in the accompanying drawings and description. The illustrative embodiments may be implemented or incorporated in other embodiments, variations and modifications, and may be practiced or carried out in various ways. For example, the blocking devices disclosed above are illustrative only and not meant to limit the scope or application thereof. Furthermore, unless otherwise indicated, the terms and expressions employed herein have been chosen for the purpose of describing the illustrative embodiments for the convenience of the reader and are not to limit the scope thereof.

Certain exemplary embodiments have been described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments is defined solely by the claims. The features illustrated or described in connection with one exemplary embodiment may be combined with the features of other embodiments. Such modifications and variations are intended to be included within the scope of the claims.

Although various embodiments have been described herein, many modifications and variations to those embodiments may be implemented. For example, different types of end effectors may be employed. Also, where materials are disclosed for certain components, other materials may be used. The foregoing description and following claims are intended to cover all such modification and variations.

What is claimed is:

1. A blocking device for a magnetic-stripe card reader, comprising:
   a cage configured to be installed on a surface proximate to at least a portion of a magnetic-stripe card reader, wherein, in an installed configuration:
      the cage extends away from the proximate surface and, in combination with the proximate surface, defines a volumetric space that contains the portion of the magnetic-stripe card reader; and
      the cage comprises an aperture through which a magnetic-stripe card is configured to be passed for reading by the magnetic-stripe card reader but through which a skimming device cannot be passed for covering the portion of the magnetic-stripe card reader.

2. The blocking device of claim 1, wherein an operating volume comprises a region adjacent the magnetic-stripe card reader into which a user must be able to manipulate the magnetic-stripe card for the magnetic-stripe card reader to read the magnetic-stripe card; and
   wherein the volumetric space defined by the cage and the proximate surface substantially surrounds the operating volume such that a combined volume defined by the cage and the proximate surface and a skimming device applied onto the cage exceeds the operating volume, thereby preventing the user from manipulating the card within the operating volume.

3. The blocking device of claim 1, wherein a ratio of the volumetric space defined by the cage in combination with the proximate surface to a volumetric space defined by the portion of the magnetic-stripe card reader is at least one-and-a-half to one.

4. The blocking device of claim 1, further comprising a fastener configured to securely affix the cage to the proximate surface.

5. The blocking device of claim 4, wherein the fastener comprises an adhesive.

6. The blocking device of claim 4, wherein the fastener comprises at least one of a screw, a bolt, or a rivet.

7. The blocking device of claim 1, wherein the cage comprises at least one metal rod.

8. The blocking device of claim 7, wherein the cage includes at least one portion of metal rod arranged as a hoop, wherein the hoop is arranged on the cage such that the hoop substantially follows contours of the proximate surface, and wherein the hoop includes a hole that is arranged to receive a fastener configured to affix the cage to the proximate surface.

9. The blocking device of claim 1, wherein the cage comprises at least one metal plate.

10. The blocking device of claim 9, wherein the at least one metal plate comprises a fold defining a first surface of the metal plate and a second surface of the metal plate on opposite sides of the fold, and wherein an angle between the first surface and the second surface matches an angle on the proximate surface.

11. The blocking device of claim 1, wherein the cage comprises a first metal plate extending from the proximate surface.

12. The blocking device of claim 11, further comprising a second metal plate extending from the first metal plate, wherein the first metal plate is arranged proximate to a first surface of the portion of the magnetic-stripe card reader, and wherein the second metal plate is arranged proximate to a second surface of the portion of the magnetic-strip card reader.

13. The blocking device of claim 12, wherein the second metal plate comprises a bent portion.

14. The blocking device of claim 13, wherein the bent portion is located at a corner of the first metal plate.

15. The blocking device of claim 13, wherein the bent portion bends away from the second surface of the portion of the magnetic-stripe card reader.

16. The blocking device of claim 13, wherein the bent portion bends towards the second surface of the portion of the magnetic-stripe card reader.

17. The blocking device of claim 12, wherein the second metal plate comprises a tab oriented in a plane distinct from a plane of the first metal plate.

18. The blocking device of claim 17, wherein the tab is located at a corner of the first metal plate.

19. The blocking device of claim 17 wherein a free end of the tab is closer to the second surface of the portion of the magnetic-stripe card reader than an opposed end connected to the first metal plate.

20. The blocking device of claim 1, wherein the proximate surface includes a surface of a transaction device.

21. The blocking device of claim 1, wherein the cage portion is spaced away from all surfaces of the magnetic-stripe card reader.

22. The blocking device of claim 1, wherein the cage comprises at least a first cage portion and a second cage portion, and
   wherein, in the installed configuration, the first cage portion is fastened to a first surface proximate to the portion of the magnetic-stripe card reader and the second cage portion is fastened to a second surface proximate to the portion of the magnetic-stripe card reader.

23. A blocking device for a magnetic-stripe card reader, comprising:

a base portion arranged to follow contours of a surface proximate to and surrounding at least a portion of a magnetic-stripe card reader on the proximate surface; and a cage portion coupled to the base portion, wherein, in an installed configuration:

the cage portion extends away from the proximate surface and, in combination with the proximate surface, defines a volumetric space that contains the portion of the magnetic-stripe card reader;

wherein the volumetric space defined by the cage portion in combination with the proximate surface is sufficiently large to resist application of a skimming device onto the cage outside of the volumetric space; and the cage portion comprises an aperture through which a magnetic-stripe card is configured to be passed for reading by the magnetic-stripe card reader but through which a skimming device cannot be passed for covering the portion of the magnetic-stripe card reader.

24. The blocking device of claim 23, wherein a ratio of the volumetric space defined by the cage in combination with the proximate surface to a volumetric space defined by the portion of the magnetic-stripe card reader is at least one-and-a-half to one.

25. The blocking device of claim 23, wherein the base portion comprises a first base portion and a second base portion, wherein the first base portion follows contours of a first surface proximate to and surrounding the portion of the magnetic-stripe card reader, and wherein the second base portion follows contours of a second surface proximate to and surrounding the portion of the magnetic-stripe card reader;

wherein the cage portion comprises a first cage portion and a second cage portion; and wherein the first cage portion is coupled to the first base portion and wherein the second cage portion is coupled to the second base portion.

26. A blocking device for a magnetic-stripe card reader, comprising:

means for surrounding at least a portion of a magnetic-stripe card reader, wherein the means comprises an aperture through which a magnetic-stripe card is configured to be passed but through which a skimming device cannot be passed for covering the portion of the magnetic-stripe card reader, and wherein the means, in combination with a surface proximate to and surrounding the portion of the magnetic-stripe card reader, defines a volumetric space that contains the portion of the magnetic-stripe card reader; and means for attaching the means for surrounding the portion of the magnetic-stripe card reader to the surface.

27. The blocking device of claim 26, wherein the volumetric space defined by the means for surrounding the portion of the magnetic-stripe card reader in combination with the proximate surface is sufficiently large to resist application of a skimming device onto the means outside of the volumetric space.

28. The blocking device of claim 27, wherein a ratio of the volumetric space defined by the means for surrounding the portion of the magnetic-stripe card reader in combination with the proximate surface to a volumetric space defined by the portion of the magnetic-stripe card reader is at least one-and-a-half to one.

* * * * *